(12) United States Patent
Katsumata et al.

(10) Patent No.: US 7,768,560 B2
(45) Date of Patent: Aug. 3, 2010

(54) MULTIBAND CAMERA CONTROL APPARATUS AND MULTIBAND CAMERA CONTROL METHOD

(75) Inventors: Masaya Katsumata, Sagamihara (JP); Toru Wada, Niiza (JP); Takeyuki Ajito, Hachioji (JP); Yasuhiro Komiya, Hino (JP)

(73) Assignee: Olympus Corporation, Tokyo (JP)

( * ) Notice: Subject to any disclaimer, the term of this patent is extended or adjusted under 35 U.S.C. 154(b) by 1107 days.

(21) Appl. No.: 11/397,971

(22) Filed: Apr. 5, 2006

(65) Prior Publication Data

US 2006/0181681 A1    Aug. 17, 2006

Related U.S. Application Data

(63) Continuation of application No. PCT/JP2004/014845, filed on Oct. 7, 2004.

(30) Foreign Application Priority Data

Oct. 7, 2003    (JP) .............................. 2003-348622

(51) Int. Cl.
H04N 5/335    (2006.01)
(52) U.S. Cl. ...................... 348/272; 348/364
(58) Field of Classification Search ................. 348/345, 348/348, 357, 349, 356, 207.99–207.2, 222.1, 348/272–273, 280, 362–364
See application file for complete search history.

(56) References Cited

U.S. PATENT DOCUMENTS

| | | | |
|---|---|---|---|
| 5,729,011 A | 3/1998 | Sekiguchi | |
| 6,111,692 A | 8/2000 | Sauter | |
| 6,151,424 A | 11/2000 | Hsu | |
| 6,211,971 B1 | 4/2001 | Specht | |
| 6,307,586 B1 | 10/2001 | Costello | |
| 6,335,984 B1 | 1/2002 | Taguchi | |
| 6,404,920 B1 | 6/2002 | Hsu | |

(Continued)

FOREIGN PATENT DOCUMENTS

JP    55-9153 A    1/1980

(Continued)

OTHER PUBLICATIONS

Related U.S. Appl. No. 11/397,970, filed Apr. 5, 2006; Inventor: M. Katsumata et al.

(Continued)

*Primary Examiner*—Tuan Ho
(74) *Attorney, Agent, or Firm*—Frishauf, Holtz, Goodman, Chick, P.C.

(57) ABSTRACT

A multiband camera control apparatus comprises a multiband camera section configured to be capable of capturing a plurality of color bands, a computer configured to control the multiband camera section, a user interface configured to transmit instruction information for the control from the user to the computer, and parameters configured to control the corresponding band in each of the plurality of bands. The user interface includes a switching instruction section configured to switch between the plurality of bands. The computer is configured to control the multiband camera section by using the parameter corresponding to the band selected according to the instruction to switch between the plurality of bands from the switching instruction section.

11 Claims, 10 Drawing Sheets

U.S. PATENT DOCUMENTS

| | | |
|---|---|---|
| 6,549,653 B1 | 4/2003 | Osawa et al. |
| 7,426,316 B2 * | 9/2008 | Vehvilainen ................ 382/275 |
| 2001/0051004 A1 | 12/2001 | Wang |
| 2002/0114533 A1 | 8/2002 | Smith et al. |
| 2003/0046004 A1 | 3/2003 | White et al. |
| 2003/0059214 A1 | 3/2003 | Partynski et al. |
| 2004/0017477 A1 * | 1/2004 | Cooper et al. ......... 348/207.99 |
| 2004/0246345 A1 | 12/2004 | Ohsawa et al. |
| 2006/0122954 A1 | 6/2006 | Podlasek et al. |
| 2006/0170779 A1 * | 8/2006 | Tanabe .................. 348/207.99 |
| 2006/0181543 A1 | 8/2006 | Katsumata et al. |
| 2006/0188150 A1 | 8/2006 | Katsumata et al. |
| 2007/0139526 A1 * | 6/2007 | Parulski et al. ......... 348/207.99 |

FOREIGN PATENT DOCUMENTS

| | | |
|---|---|---|
| JP | 4-172789 A | 6/1992 |
| JP | 5-34202 A | 2/1993 |
| JP | 5-183916 A | 7/1993 |
| JP | 6-8897 A | 1/1994 |
| JP | 6-241905 A | 9/1994 |
| JP | 8-233658 A | 9/1996 |
| JP | 11-154220 A | 6/1999 |
| JP | 2000-196965 A | 7/2000 |
| JP | 2000-329617 A | 11/2000 |
| JP | 2001-5046 A | 1/2001 |
| JP | 2001-99710 A | 4/2001 |
| JP | 2002-112101 A | 4/2002 |
| JP | 2002-149148 A | 5/2002 |
| JP | 2004-5566 A | 1/2004 |
| JP | 2004-147287 A | 5/2004 |
| JP | 2004-219092 A | 8/2004 |
| WO | 99/05547 A1 | 2/1999 |
| WO | 01/06761 A1 | 1/2001 |

OTHER PUBLICATIONS

Related U.S. Appl. No. 11/397,980, filed Apr. 5, 2006; Inventor: M. Katsumata et al.

Notification Concerning Transmittal of International Preliminary Report on Patentability for PCT/JP2004/014845; 7 sheets.

Supplementary European Search Report dated Jan. 19, 2010 issued in counterpart European Application No. 04792142.4.

* cited by examiner

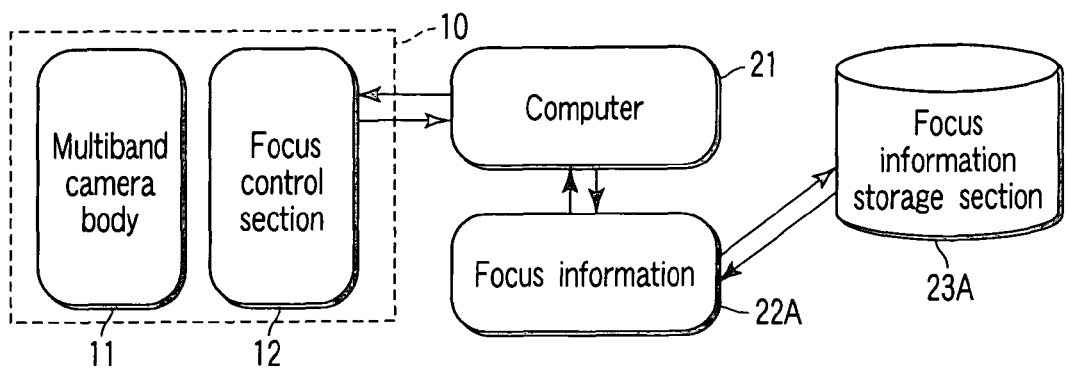
FIG. 3
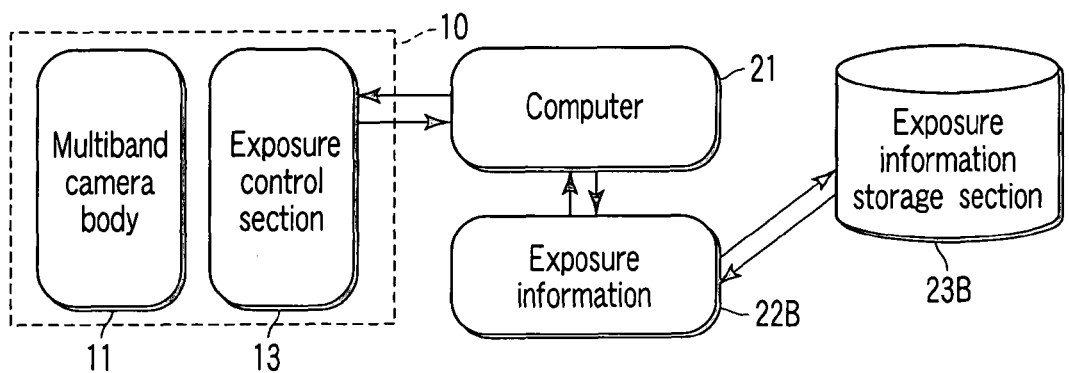
FIG. 4
| Camera control of each band | | | |
|---|---|---|---|
| Band | Focus position [μm] | Exposure time | Aperture |
| 1 | 1,102.225 | 1/30 | 1.4 |
| 2 | 1,110.000 | 1/250 | 8 |
| 3 | 42,698.398 | 1/15 | 2.0 |
| 4 | 24,773.181 | 1/125 | 5.6 |
| 5 | 8,721.325 | 1/4 | 1.4 |
| 6 | 4,684.436 | 1/8 | 2.8 |
OK   Cancel
FIG. 5

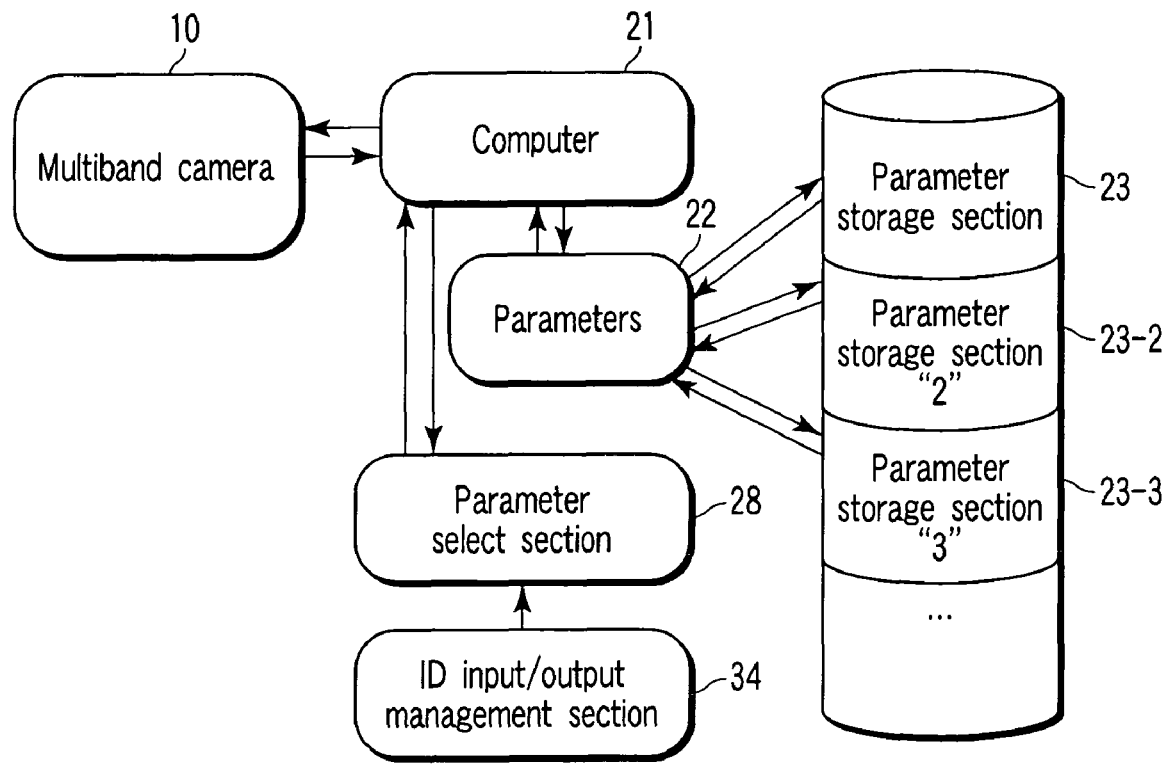
F I G. 14
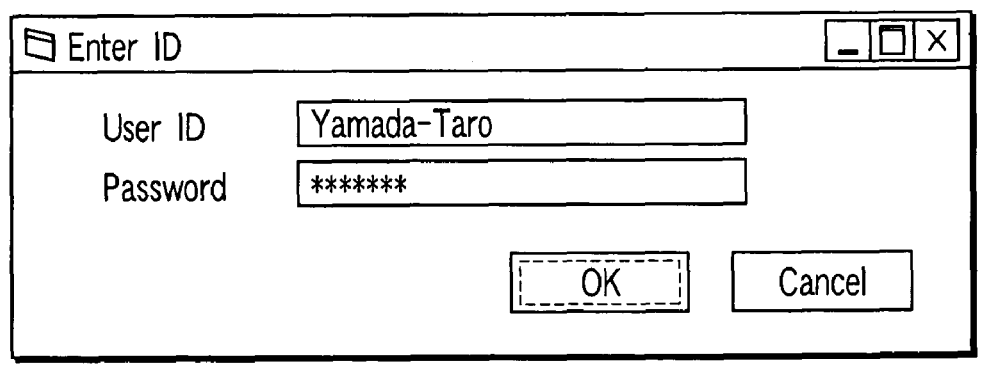
F I G. 15

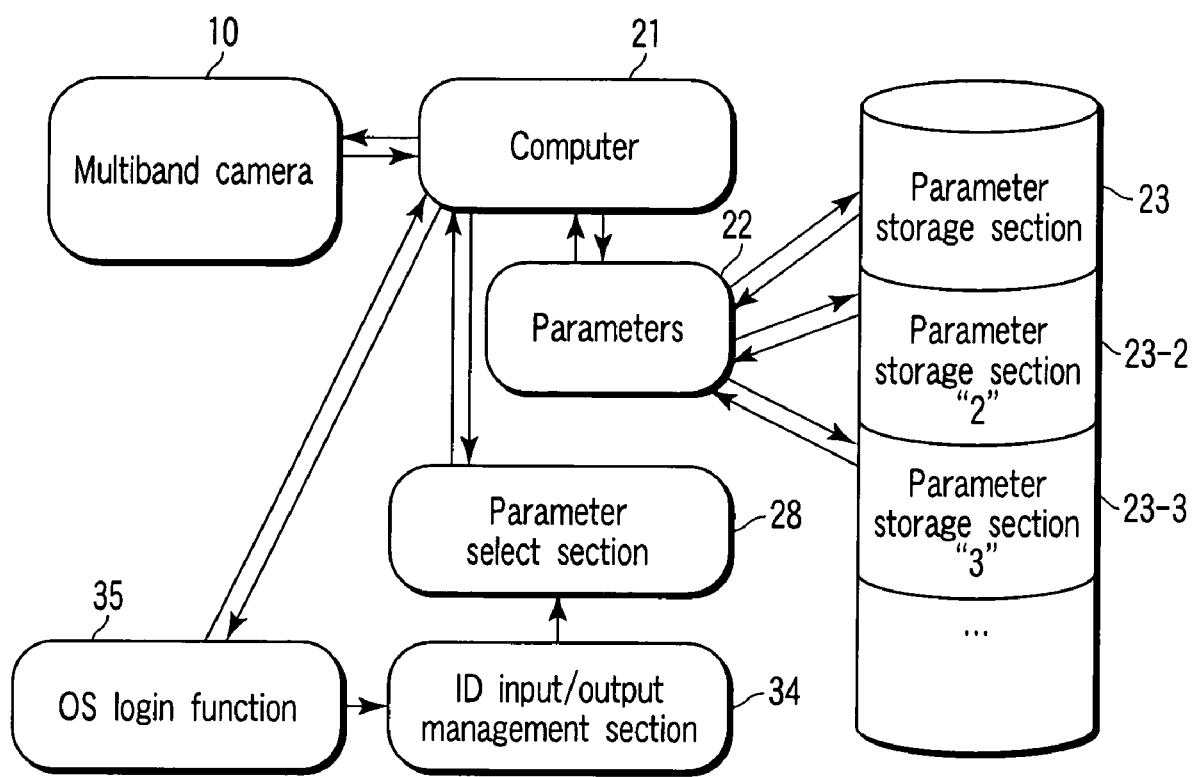
F I G. 16

MULTIBAND CAMERA CONTROL APPARATUS AND MULTIBAND CAMERA CONTROL METHOD

CROSS-REFERENCE TO RELATED APPLICATIONS

This is a Continuation Application of PCT Application No. PCT/JP2004/014845, filed Oct. 7, 2004, which was published under PCT Article 21(2) in Japanese.

This application is based upon and claims the benefit of priority from prior Japanese Patent Application No. 2003-348622, filed Oct. 7, 2003, the entire contents of which are incorporated herein by reference.

BACKGROUND OF THE INVENTION

1. Field of the Invention

This invention relates to a multiband camera control apparatus and a multiband camera control method.

2. Description of the Related Art

A multiband camera is a type of camera that captures in a plurality of bands having more specific wavelength transmission characteristics than those of the R, G, B filters of an ordinary 3-band color camera. As means for switching bands, a wavelength variable filter as disclosed in Jpn. Pat. Appln. KOKAI Publication 2001-99710 may be used, or a rotating filter as disclosed in U.S. Pat. No. 6,549,653 may be used. Alternatively, bands composed of light emissions from a single LED or a plurality of LEDs having narrow-band spectroscopic characteristics have been proposed. Although the number of bands differs, depending on the apparatus and purpose, the transmittance characteristic in each band is as shown in FIG. 2 of Jpn. Pat. Appln. KOKAI Publication 2001-99710.

Since there are generally as many captured images as there are bands, there are 16 images in 16 bands, as shown in FIG. 2 of Jpn. Pat. Appln. KOKAI Publication 2001-99710, and there are 10 images in 10 bands with a rotating filter, as shown in FIG. 5B of U.S. Pat. No. 6,549,653.

As for band switching, for example, when there are images in 18 bands, a method of displaying a graphical user interface (hereinafter, abbreviated as GUI) to select one of 18 bands for switching can be considered. Alternatively, the following method can be considered: a GUI having various setting items is displayed and the band is switched using, for example, the choice "Filter/Band" in the setting items. However, it is difficult to imagine what wavelengths these bands show only from the band numbers.

A user who wants to capture multiband images, while switching bands with a GUI as described above has to set the parameters which will possibly change each time the band is switched. For example, one of such parameters may be the item "Shutter Speed." This is for performing switching control of the exposure time of the multiband camera. Generally, since exposure time can be changed band by band, the user has to reset the exposure time each time the user changes bands.

Similarly, as an item to be set on a band-by-band basis, pixel shift using the item "Shift/Y" can be considered. In addition, many other items, including aperture and focus position, which are changed on a band-by-band basis can be considered.

Furthermore, in a method of controlling the focus in a multiband camera, a case where autofocusing is done on a band-by-band basis can be considered, as in Jpn. Pat. Appln. KOKAI Publication 2001-5046. In this case, the user need not adjust the focus position before capturing. In capturing, the processes in S2, S3, and S4 shown in FIG. 2 of Jpn. Pat. Appln. KOKAI Publication 2001-5046 are carried out on a band-by-band basis. That is, using the autofocus function, it is determined whether the change of the focus position is necessary (S2). If the focus is changed, autofocusing is done (S3).

BRIEF SUMMARY OF THE INVENTION

According to a first aspect of the present invention, there is provided a multiband camera control apparatus comprising:

a multiband camera section configured to be capable of capturing a plurality of color bands;

a computer configured to control the multiband camera section;

a user interface configured to transmit instruction information for the control from the user to the computer; and parameters configured to control the corresponding band in each of the plurality of bands, wherein the user interface includes a switching instruction section configured to switch between the plurality of bands, and the computer is configured to control the multiband camera section by using the parameter corresponding to the band selected according to the instruction to switch between the plurality of bands from the switching instruction section.

According to a second aspect of the present invention, there is provided a multiband camera control method of controlling a multiband camera including:

a multiband camera section configured to be capable of capturing a plurality of color bands; and a computer configured to control the multiband camera section, the multiband camera control method comprising:

preparing a user interface configured to transmit instruction information for the control from the user to the computer and parameters configured to control the corresponding band in each of the plurality of bands;

causing the user interface to give a switching instruction to switch between the plurality of bands; and causing the computer to control the multiband camera section by using the parameter corresponding to the band selected according to the instruction to switch between the plurality of bands.

According to a third aspect of the present invention, there is provided a multiband camera control apparatus comprising:

a computer configured to be connectable to a multiband camera capable of capturing a plurality of color bands;

a user interface configured to transmit instruction information for the control from the user to the computer; and parameters configured to control the corresponding band in each of the plurality of bands, wherein the user interface includes a switching instruction section configured to switch between the plurality of bands, and the computer is configured to control the multiband camera connected to the computer by using the parameter corresponding to the band selected according to the instruction to switch between the plurality of bands from the switching instruction section.

According to a fourth aspect of the present invention, there is provided a multiband camera control apparatus comprising:

multiband camera means for being capable of capturing a plurality of color bands;

computer means for controlling the multiband camera means;

user interface means for transmitting instruction information for the control from the user to the computer means; and parameters for controlling the corresponding band in each of the plurality of bands, wherein the user interface means includes switching instruction means for switching between the plurality of bands, and the computer means controls the multiband camera means by using the parameter corresponding to the band selected according to the instruction to switch between the plurality of bands from the switching instruction means.

According to a fifth aspect of the present invention, there is provided a multiband camera control method of controlling a multiband camera including:

multiband camera means for being capable of capturing a plurality of color bands; and computer means for controlling the multiband camera means, the multiband camera control method comprising the steps of:

preparing a user interface means for transmitting instruction information for the control from the user to the computer means and parameters for controlling the corresponding band in each of the plurality of bands;

causing the user interface means to give a switching instruction to switch between the plurality of bands; and causing the computer means to control the multiband camera means by using the parameter corresponding to the band selected according to the instruction to switch between the plurality of bands.

According to a sixth aspect of the present invention, there is provided a multiband camera control apparatus comprising:

computer means for being connectable to a multiband camera capable of capturing a plurality of color bands;

user interface means for transmitting instruction information for the control from the user to the computer means; and parameters for controlling the corresponding band in each of the plurality of bands, wherein the user interface includes switching instruction means for switching between the plurality of bands, and the computer controls the multiband camera connected to the computer means by using the parameter corresponding to the band selected according to the instruction to switch between the plurality of bands from the switching instruction means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows a system configuration of a multiband camera control apparatus according to a second embodiment of the present invention;

FIG. 4 shows another system configuration of the multiband camera control apparatus according to the second embodiment;

FIG. 5 shows an example of a GUI for setting a focus position and an exposure time on a band-by-band basis;

FIG. 14 shows a system configuration of a multiband camera control apparatus according to an eighth embodiment of the present invention;

FIG. 15 shows an ID input screen; and

FIG. 16 shows a system configuration of a multiband camera control apparatus according to a ninth embodiment of the present invention.

DETAILED DESCRIPTION OF THE INVENTION

Hereinafter, referring to the accompanying drawings, the best mode for carrying out the invention will be explained.

First Embodiment

Figure 1:
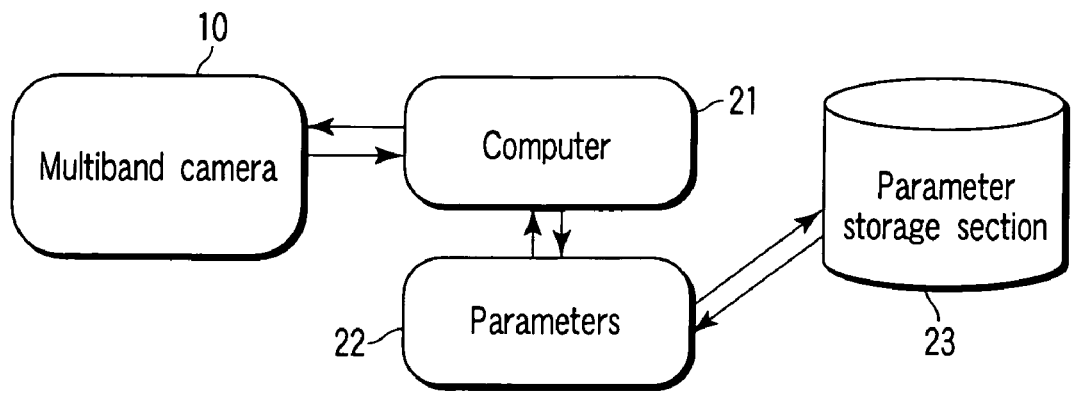
FIG. 1 shows a system configuration of a multiband camera control apparatus according to a first embodiment of the present invention.

As shown in FIG. 1, a multiband camera 10 is controlled by a computer 21 in a first embodiment of the present invention. The multiband camera 10 incorporates a CCD as an image capturing element, captures images, converts the images into electronic image data, and sends the image data to the computer 21. To acquire the image the user wants, various settings must be done on the multiband camera 10. For example, the setting of the exposure time (or shutter speed), aperture, focus position, and the like can be considered. The user changes the settings of the parameters, while checking the live images sent from the multiband camera 10 on a display (not shown) attached to the computer 21.

It is desirable for the multiband camera 10 to have a plurality of bands and that the above parameters should be set independently. Therefore, during control, the parameters 22 are held in a memory attached to the computer 21. The parameters are held independently on a band-by-band basis. Moreover, the held parameters 22 can be stored into a parameter storage section 23 as needed. In addition, the parameters stored in the parameter storage section 23 can be read out as needed.

The computer 21 (and parameters 22 and parameter storage section 23) may be integrally provided in the multiband camera 10. Alternatively, a personal computer may be used as the computer 21 and be connected via an interface, such as USB, to the multiband camera 10, thereby enabling the image data from the multiband camera 10 to be acquired and the control signal necessary for the multiband camera 10 to be transmitted. When a personal computer is used as the computer 21, a hard disk drive (HDD) is often used as the parameter storage section 23.

Next, a method of controlling the multiband camera 10 actually using the parameters 22 will be explained using a flowchart in FIG. 2. The flowchart is a part of the band switching function which is a part of a program that is executed on the computer 21 in using the multiband camera 10 and comprehensively carries out processes including image acquisition, live image acknowledgement, and post-processing.

That is, in this task, whether there is a band switching request is monitored (step S11). The band switching request may be made by user specification through a user interface as described later or by the user's operation of a specific selector switch provided on the multiband camera 10.

Then, when there is a band switching request, band switching is done (step S12). The actual band switching method differs according to the type of multiband camera 10. For example, when band switching is done using a rotating filter as disclosed in U.S. Pat. No. 6,549,653, that is, using bandpass filters each with a narrow-band wavelength, a control signal for rotating its filter rotating section is transmitted to the multiband camera 10.

Next, the parameters 22 are read from the parameter storage section 23 and it is determined on the basis of the parameters 22 whether to control the multiband camera 10 (step S13). In some systems, the information in the parameter storage section 23 need not depend on and the computer 21 may make its own decision. Alternatively, a setting process using the parameter 22 never fails to be carried out and the determining process in step S13 may be omitted.

Then, when multiband camera 10 is controlled using the parameters 22, the multiband camera 10 is controlled on the basis of the parameters 22 (step S14). The parameters 22 may be moved from the parameter storage section 23 to a temporary memory or the like of the computer before band switching or with another timing.

After step S14, or when it has been determined in step S13 that the multiband camera 10 won't be controlled using the parameters 22, control is returned to step S11 and the next band switching is waited for.

If either band switching in step S12 or control unique to the band in step S14 or both require a long processing time, these two may be controlled simultaneously. That is, programming has only to be done in such a manner that the process in step S12 is made asynchronous and, even if the operation is not completed immediately after a band switching command is sent, control is permitted to proceed to step S13 and step S14.

The system configuration depends on the type of the multiband camera 10, the computer 21, and the storage medium at that time. Therefore, the multiband camera 10 itself may have no CCD element. Moreover, the control is shared between automatic control by the computer 21 and manual control by the user. Consequently, the parameters for each band are not necessarily the exposure time (or shutter speed), aperture, and focus position. A part of or all of these may not correspond to the parameters. Depending on the camera, setting items other than the above parameters may be necessary. Therefore, there is a possibility that new setting items not described here will come under the parameters. As long as the flow is the same as that of FIG. 2, it can be considered to be within the scope of the present invention.

Furthermore, depending on the camera, the user may manually set a parameter, such as the focus position, by turning the lens. Even in manual setting, the operated part has a scale or other identifying means. Therefore, if a parameter is set band by band, the computer 21 displays its setting value on a display unit. The user can set the parameter, while checking it on the display unit. If the multiband camera 10 has display means, the computer may send parameter information to the multiband camera 10. Then, the user may set the parameter, while checking it on the camera 10.

On the other hand, the parameters 22 are basically stored band by band independently. However, parameters common to a part of or all of the bands may be stored on a band-by-band basis or shared by them in one position. In this case, if these parameters should be processed with the timing of band switching in the flowchart of FIG. 2, this may be carried out in step S14 using the parameters as a part of control unique to the band.

Since control should be performed before band switching is done, depending on parameters, the sequence of the process in step S12 and the processes in step S13 and S14 may be reversed in a part of or all of the parameter control processes.

A general method of determining the parameters 22 is to determine parameters, while checking the live images actually output from the multiband camera 10 on the display (not shown), and store the values in the parameter storage section 23. Of course, another method can be considered. For instance, when the exposure time is found in calculation or when the focus position is determined physically, the values have only to be written directly into the parameter storage section 23 and there may be no need to check the images. In any case, if the parameters 22 are stored in the form of comma-deliminated text data or tab-deliminated text data, it is convenient for the user or a person at the manufacturer to do checking or editing directly with a text editor even when the computer 21 accesses the parameters.

By the above-described method, the settings related to the band are changed using the parameters 22 each time the band is switched, which makes it possible to do detailed setting unique to each band of the multiband camera 10. Moreover, the user has only to concentrate on band switching and need not memorize a part of or all of the parameters. In addition, since the time required to find suitable parameters in band switching can be omitted, this produces the effect of saving the user time and labor and capturing or controlling multiband image exactly in a short time.

Second Embodiment

The multiband camera 10 can be disassembled into a multiband camera body 11 and a focus control section 12 as shown in FIG. 3. Alternatively, as shown in FIG. 4, the multiband camera 10 can be disassembled into a multiband camera body 11 and an exposure control section 13. That is, either the focus control section 12 or exposure control section 13 or both of them may be provided in the multiband camera 10. Of course, there may be a case where the multiband camera 10 further includes other functions and is controlled using the parameters of the functions.

The outline of the functions is almost the same as in the first embodiment and the parameters 22 includes focus information 22A and/or exposure information 22B. Wanting to set focus position and exposure time on a band-by-band basis, the user sets the values band by band using a GUI as shown in FIG. 5. In the example of FIG. 5, the number of bands is 6 and focus position, exposure time, and aperture information are set on a band-by-band basis. Setting may be done without seeing the images. Normally, the user sets these three parameters for each of the 6 bands, while checking the live images sent from the multiband camera 10 on the display (not shown) attached to the computer 21.

When these parameters are set and control is performed, the parameters 22 (focus information 22A and/or exposure information 22B) are held in a memory attached to the computer 21. However, as the need arises, the parameters can be stored into the parameter storage section 23 (focus information storage section 23A and/or exposure information storage section 23B). In addition, the parameters stored in the parameter storage section can be read out.

A method of controlling the multiband camera 10 actually using the parameters will be explained using the flowchart of FIG. 2.

The flowchart helps explain a part of the band switching function as in the first embodiment. That is, in this task, whether there is a band switching request is being monitored (step S11). If there is a band switching request, band switching is done (step S12).

Thereafter, in step S13, focus position (focus information 22A) and/or exposure time (exposure information 22B) are read from the parameter storage section 23 (focus information storage section 23A and/or exposure information storage section 23B) and a check is made to see if the values are the same as those before band switching was done. Here, for example, when the band switching speed is required to increase to meet the system requirement, the following method can be considered: if the same focus position is obtained as a result of a comparison between the band before switching and the band after switching, control proceeds to No in step S13, omitting the next step S14. Moreover, the same processing can be considered in a case where the exposure time remains unchanged before and after the band switching. Alternatively, the focus position and/or exposure time never fail to be set again using the read-out values and the process in step S13 itself may be omitted.

Then, in step S14, the focus position and/or exposure time are read from the parameter storage section 23 and, according to the values, the focus control section 12 and/or exposure control section 13 of the multiband camera 10 are controlled. The focus position and/or exposure time may be moved from the parameter storage section 23 to a temporary memory or the like of the computer 21 before band switching or with another timing. Then, after the process in step S13 or step S14 is completed, control returns to step S11 and the next band switching is waited for.

If either band switching in step S12 or control unique to the band in step S14 or both require a long processing time, these two may be controlled simultaneously. That is, programming has only to be done in such a manner that the process in step S12 is made asynchronous and, even if the operation is not completed immediately after a band switching command is sent, control is permitted to proceed to step S13 and step S14.

Furthermore, depending on the camera, the user may manually set a parameter, such as the focus position, by turning the lens. An implementation method in this case will be explained.

First, a method of determining focus information 22A, a setting value, and storing it will be described. Suppose the camera is provided with a lens housing and the camera is focused by manually turning the lens housing. Moreover, if the shortest focal length is 0.5 m, a scale graduated up to ∞ is marked. In this case, the user brings the camera into the best focus position by manually turning the lens housing, while viewing the image in live display. After having finished setting, the user reads the scale value and writes the value in the focus position on the GUI of FIG. 5. This work is done to all of the bands. The values are stored in the focus information storage section 23A.

Next, a method of controlling the multiband camera using the focus information will be described. Setting is done according to the flowchart of FIG. 2. In step S14, on the screen of the computer 21, a GUI as shown in FIG. 5 is displayed on the basis of the focus information 22A stored in the focus information storage section 23A. The user has only to read the focus position written in the band to be set and bring the camera to the focus position, while looking at the scale provided on the camera lens.

If necessary, the exposure time (exposure information 22B) and aperture may be set in the same method even in manual control.

By the above-described method, the focus position (focus information 22A) and/or exposure time (exposure information 22B) can be set using the values independent on a band-by-band basis in the multiband camera. The user has only to switch bands, thereby reproducing the correct focus position and/or exposure time, and need not be conscious of what the value is. Furthermore, since the time required to determine a suitable focus position and/or exposure time can be omitted in band switching, this produces the effect of saving the user time and labor and enabling capturing or controlling multiband image exactly in a short time.

Third Embodiment

To set parameters band by band, as the number of parameters increases, the user interface becomes more complex accordingly.

Figure 6:
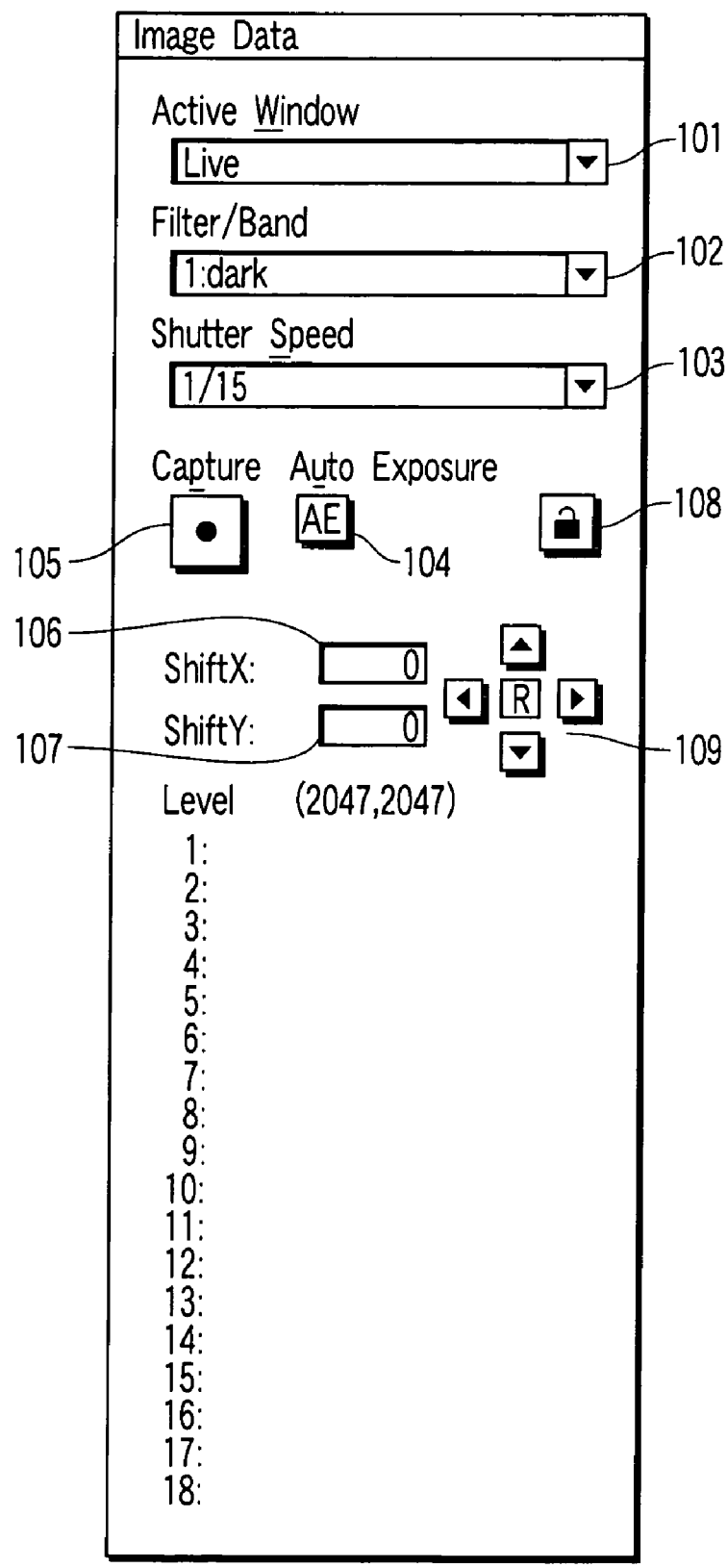
FIG. 6 shows an example of a GUI for controlling the multiband camera.

FIG. 6 shows an example of a GUI for controlling the multiband camera 10. Explanation will be given, beginning with the top downward. "Active Window" change list 101 is for selecting an active window to be displayed at the top when images are displayed on a plurality of windows. "Filter/Band" change list 102 is for selecting a band. "Shutter Speed" change list 103 is for setting and checking the exposure time for each band. As for exposure time, a band is selected using "Filter/Band" change list 102 and an exposure time suitable for the band is set using "Shutter Speed" change list 103. Alternatively, using "Auto Exposure" button 104 below "Shutter Speed" change list 103, the exposure times for all of or a part of the bands are set automatically. In this case, too, the processing in the software is such that the exposure time is determined referring to pixel information, while capturing images band by band. This is done to all of the bands. Since the determined exposure time can be checked on "Shutter Speed" change list 103 by selecting the band on "Filter/Band" change list 102, when capturing is done over all of the bands with the set exposure time by the checking method, a similar procedure to setting one band at a time is followed.

"Capture" button 105, which is to the left of "Auto Exposure" button 104, can start to capture all of the bands. At the start of capturing, an image is captured using a preset exposure time. Therefore, although "Auto Exposure" button 104 and "Capture" button 105 are not direct exposure time setting buttons, they have the function of controlling exposure.

In this embodiment, a method of dynamically changing the size of a button displayed on the GUI for controlling the multiband camera will be described using "Auto Exposure" button 104 and "Capture" button 105.

Figure 7:
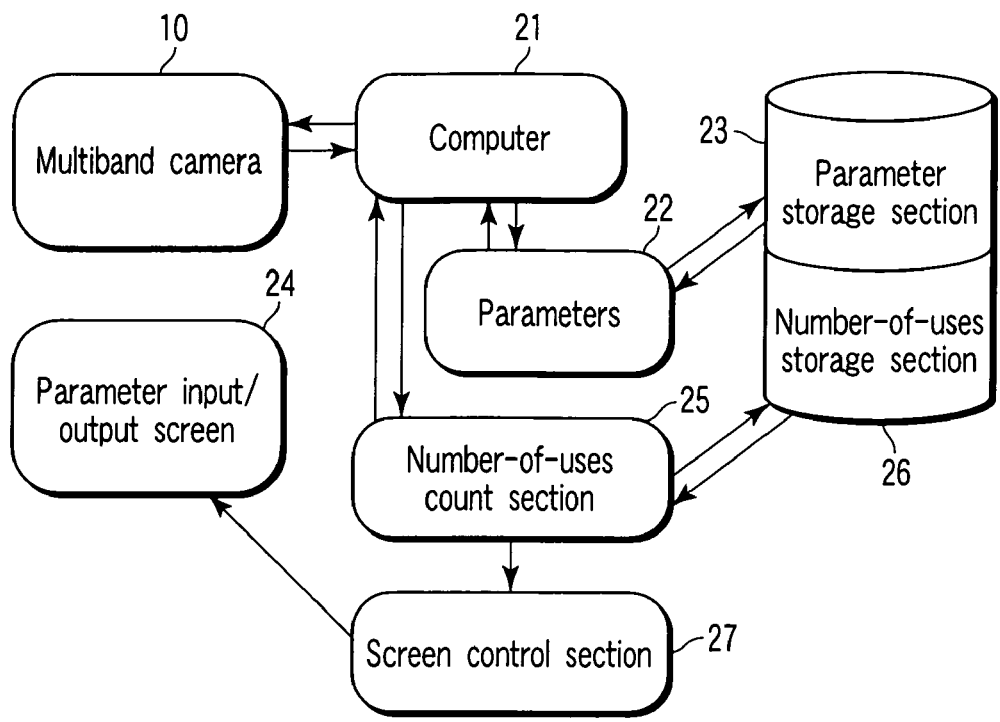
FIG. 7 shows a system configuration of a multiband camera control apparatus according to a third embodiment of the present invention.

FIG. 7 shows a system configuration of the multiband camera control apparatus according to the third embodiment. As in FIG. 1, the control apparatus includes a multiband camera 10, a computer 21, parameters 22, and a parameter storage section 23. In addition to these, the control apparatus further includes a parameter input/output screen 24 which enables the parameters 22 to be checked and the timing of setting to be input. In this example, on the parameter input/output screen 24, a GUI as shown in FIG. 6 is displayed and "Auto Exposure" button 104, "Capture" button 105, "Shutter Speed" change list 103, and other GUIs enable the respective objectives to be achieved. There is a number-of-uses count section 25 realized by a program in the computer 21, which can count the number of accesses to a desired item on a GUI. Here, the number of times each of "Auto Exposure" button 104 and "Capture" button 105 is pressed and the numbers are stored in a number-of-uses storage section 26. A screen control section 27 acts on the parameter input/output screen 24 by a method described below and changes the optical effect of a desired GUI. The optical effect means a change in the size, highlighted characters, colors, shapes, blinking states, and the like. Here, explanation will be given on the assumption that the button sizes are changed according to the number of times each of "Auto Exposure" button 104 and "Capture" button 105 is pressed.

(1) FIG. 6 shows a GUI for changing the settings, while watching live images. After checking the exposure time, the user captures all of the bands. As described above, although the exposure time can be adjusted band by band manually, it can also be adjusted automatically in all of the bands by pressing "Auto Exposure" button 104.

(2) Once the exposure time has been adjusted, it is not necessary to set the exposure time each time unless the conditions for the light source are changed. In contrast, "Capture" button 105 is pressed each time capturing is done. Therefore, as shown in FIG. 6, it is desirable that "Capture" button 105 be displayed larger than "Auto Exposure" button 104. The method will be described below.

(3) The number of times "Capture" button 105 was pressed since the installation of the control unit is designed to be stored in the number-of-uses storage section 26. Let the value be cCapture. Similarly, let the number of times "Auto Exposure" button 104 was pressed be cAE. This value is stored in the number-of-uses storage section 26. If the standard width and height of these two buttons are sW and sH, respectively, when cCapture>=cAE, the width cW and height cH of "Capture" button 105 are determined as follows:

$cW = cCapture/cAE * sW$, $cH = cCapture/cAE * sH$

Furthermore, when cCapture<cAE, the width aW and height aH of "Auto Exposure" button 104 are determined as follows:

$aW = cAE/cCapture * sW$, $aH = cAE/cCapture * sH$

In this way, the size of "Capture" button 105 and that of "Auto Exposure" button 104 are determined. The allowable range of the size, that is, the minimum width, minimum height, maximum width, and maximum height of the size are determined beforehand. If the size exceeds the range, the size is caused to fall within the range, which prevents the button from becoming too large or too small.

In addition, the size of the button need not be changed each time the software is activated. For example, it is conceivable that the software developer has determined the use frequency of the button experimentally by the above-described method before shipping the product to the end user and the size of the button is changed relatively and fixed at the time of shipment.

Objects to be represented in buttons can be considered to be used not only as described above but also in an autofocus function which needs band parameters.

Even if the introduction of the multiband camera 10 makes a GUI for setting the camera more complex, the size of a GUI, such as a button for setting the camera, is changed relatively by the above-described method and a frequently used GUI is displayed in a larger size, thereby enabling the user to find the desired setting button quickly, which produces the effect of decreasing erroneous operations caused by pressing the wrong buttons.

Fourth Embodiment

To set parameters for each band, as the number of parameters increases, the user interface gradually becomes more complex.

FIG. 6 shows an example of a GUI for controlling the multiband camera 10. "Active Window" change list 101 to "Auto Exposure" button 104 are as explained in the third embodiment. Below them, there are "ShiftX" and "ShiftY" which have the function of shifting pixels in the x-axis direction and the y-axis direction, respectively. To the right of these, there are edit boxes (white frames) 106, 107 to which numeric values can be input. Integers are input to the boxes, thereby shifting pixels in units of one pixel. Although not shown, pixel shift may be performed by a method of using, for example, sub-pixels in units of 0.1 pixel.

The purpose of this function will be described. In the multiband camera 10, the central wavelength and band are change band by band and capturing is done. If an optical system switching member, such as a band-pass filter, is used as means for doing this, there is a possibility that the image will shift in a plane perpendicular to the optical axis due to a slight optical path difference caused each time the filter is changed. If the coordinate axes of the plane are x and y, a method of correcting the difference between bands by pixel shifting can be considered. In addition, the center wavelength differing from band to band means the possibility that the magnification of the target image will deviate slightly. Therefore, the target part of the image can shift band by band. To correct this, the pixels in each band are adjusted, sifting them in the x-axis and y-axis directions.

It is highly possible that the above-described pixel shift will be attributable to the optical system. Even when the end user uses the multiband camera, once the user has determined the number of bands in the multiband camera 10 and decided on wavelength switching means, it is highly likely that the amount of pixel shift will be determined. Therefore, the end user has to make a pixel shift correction in setting these units. Once the user has fixed the number of bands and the wavelength select means, the user need not make the correction each time capturing is done. In contrast, there is every possibility that the exposure time and focus position explained in the third embodiment will be changed each time capturing is done. In this embodiment, to meet such a requirement, a solving procedure differing from that in the third embodiment will be explained.

Figure 8:
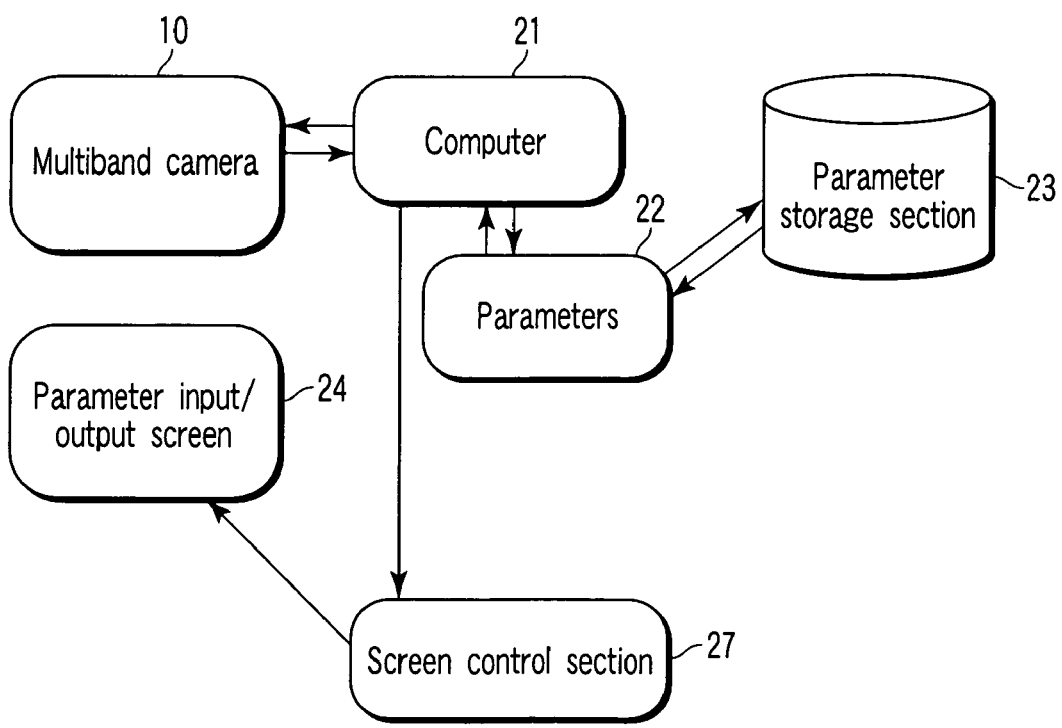
FIG. 8 shows a system configuration of a multiband camera control apparatus according to a fourth embodiment of the present invention.

As shown in FIG. 8, the multiband camera control apparatus of the fourth embodiment includes the multiband camera 10, computer 21, parameters 22, and parameter storage section 23 as in FIG. 1. In this embodiment, the control apparatus further includes a parameter input/output screen 24 which makes it possible to check parameters 22 and input the setting timing. In this example, a GUI as shown in FIG. 6 is displayed on the screen. The GUI has a "ShiftX" function, a "ShiftY" function, and an amount-of-pixel-shift setting lock function. In addition, in this embodiment, the control apparatus further includes a screen control section 27 realized by a program of the computer 21. In the example of FIG. 6, the screen control section 27 works on the parameter input/output screen 24 to lock the setting of the amount of pixel shift.

Using FIG. 6, the way the user inhibits the change of the pixel shift correction value will be explained. There is a key icon 108 in the "unlocked state" to the right of "Auto Exposure" button 104. In this state, the change of the pixel shift correction value is not inhibited. Therefore, the user can input the amount of pixel shift in integers using "ShiftX" and "ShiftY" edit boxes 106, 107. Since the edit boxes 106, 107 are for the amount of pixel shift in the band shown in "Filter/Band" change list 102, the example of FIG. 6 shows a case where the amount of pixel shift in band 1 is (0, 0). To check and correct the state in band 2, the user selects band 2 in "Filter/Band" change list 102, checks the values in the edit boxes 106, 107 of "ShiftX" and "ShiftY" and then changes the values. If this process is carried out on all of the bands, the user can set the desired amount of pixel shift in all of the bands.

Figure 9:
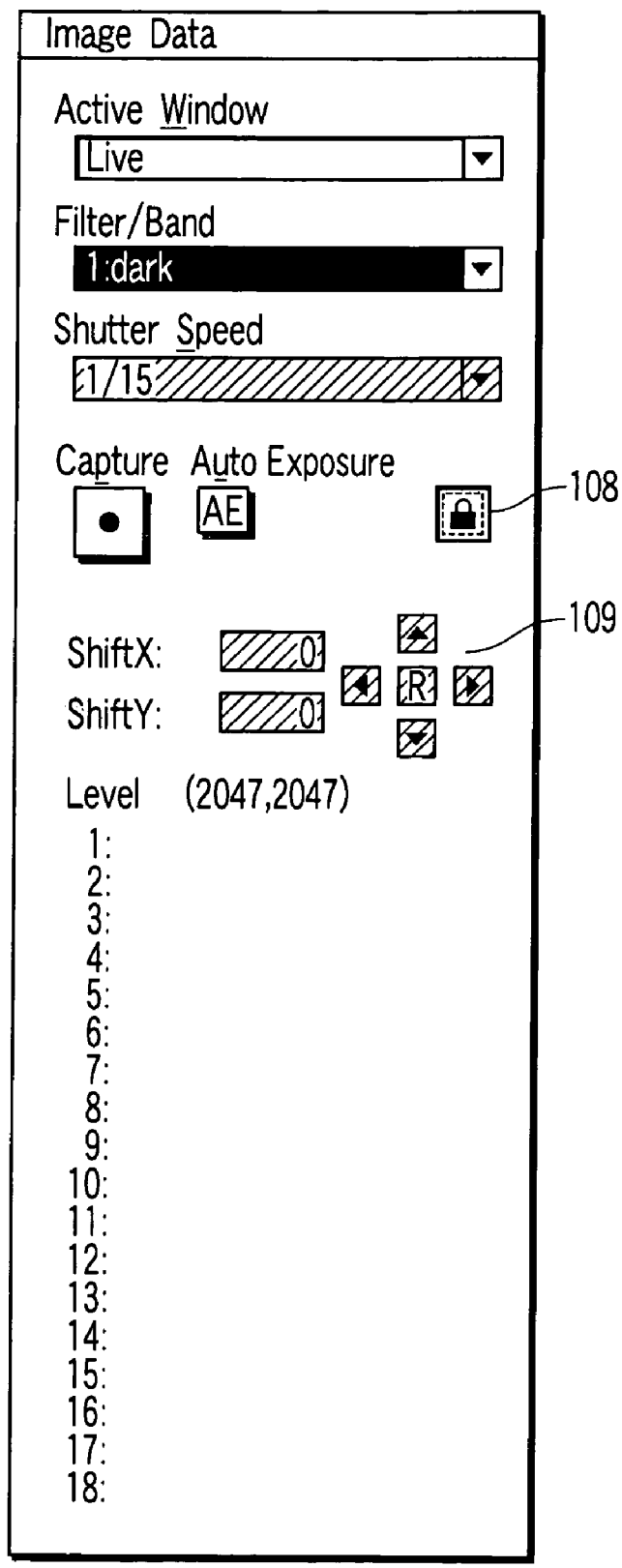
FIG. 9 shows an example of a GUI for controlling the multiband camera whose key icon has been brought into the "locked state"

When wanting to lock (or inhibit) the function without correcting the pixel shift in the next and later operations, the user clicks the key icon 108 in the "unlocked state" to the right of "Auto Exposure" button 104 to change the key icon 108 into the "locked state" as shown in FIG. 9. In this example, to cause the function to seem continuing, the holding down state of the key icon 108 in the "locked state" is kept, thereby improving the visibility. In this state, the labels of "ShiftX" and "ShiftY", their edit boxes 106, 107, and upward, downward, rightward, and leftward buttons 109 that perform pixel shift interlocking with the edit boxes 106, 107 are disabled. In this state, although the preset amount of pixel shift cannot be changed, since the set value is effective, pixel shift is carried out using the value.

Taking the user's convenience into account, the key icon is always made "unlocked" by switching between the "unlocked state" and the "locked state" in the default each time the software starts up. Alternatively, the software may be started up in such a manner that the state of the key set last in the state where the software was started up in the preceding session is reproduced.

By the above method, even when the introduction of the multiband camera 10 has made a GUI for setting the camera complex, switching between the enabling and disabling of a GUI function for less frequently used parameters makes frequently used GUIs relatively conspicuous, thereby enabling the user to find the desired setting buttons quickly. This produces the effect of reducing erroneous operations caused by the operation of GUIs for less frequently used parameters.

Fifth Embodiment

Figure 10:
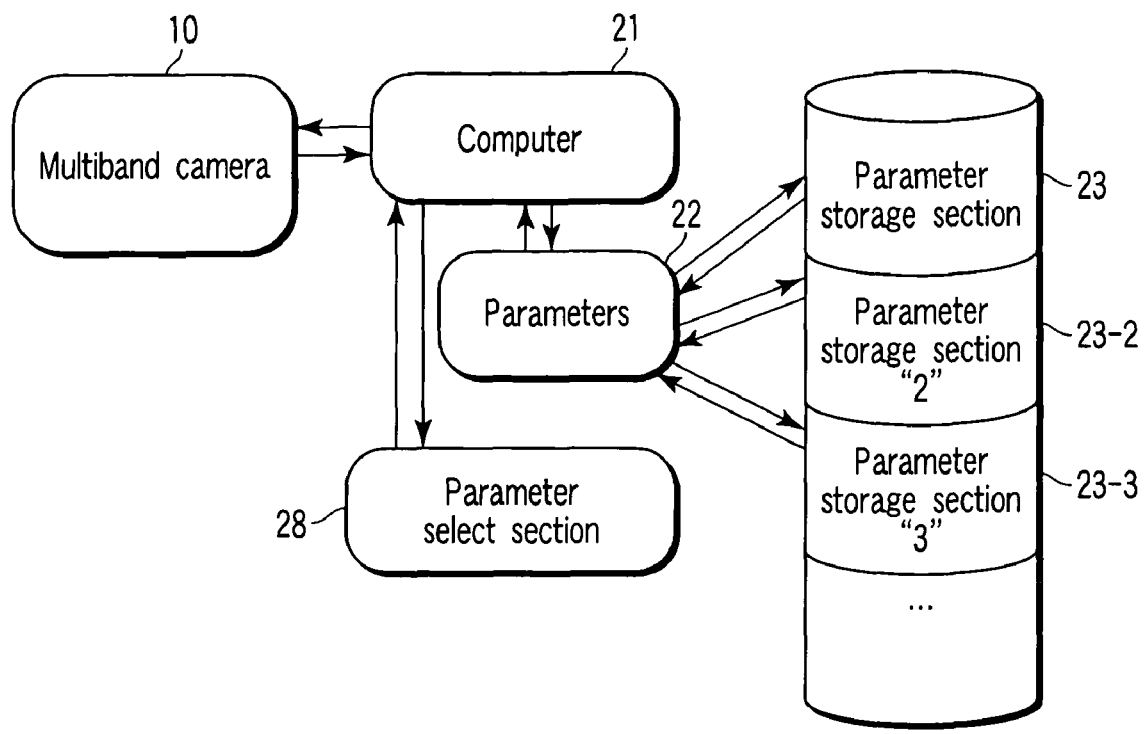
FIG. 10 shows a system configuration of a multiband camera control apparatus according to a fifth embodiment of the present invention.

As shown in FIG. 10, the multiband camera 10, computer 21, parameters 22, and parameter storage section 23 in a multiband camera control apparatus according to a fifth embodiment of the present invention are the same as in FIG. 1. In this embodiment, however, the control apparatus further includes a parameter storage section "2" 23-2, a parameter storage section "3" 23-3, ..., a parameter storage section "n". Here, n is an integer equal to or larger than 2. Its maximum value depends on the system or the user's requirement. To select these, the control apparatus includes a parameter select section 28.

Hereinafter, the way the user actually selects the parameters will be explained. The user who uses software to control the multiband camera 10 determines which parameter set is better when the software starts up or when the user uses the parameters 22. In FIG. 10, the user is allowed to select the parameters from the parameter storage section 23, parameter storage section "2" 23-2, or parameter storage section "3" 23-3, ....

Since the selected parameters can be replaced with the parameters 22, the desired processes can be carried out in a similar flow to that in the first embodiment after the selection. In the middle of the processing, the user may change a part of or all of the parameters 22. When the changed parameters are not used again, the program controlling the multiband camera 10 may be ended. When they are used again, the parameters 22 are stored in the parameter storage section 23 before the program is ended with suitable timing in the period from immediately after the parameters are changed to immediately before the program has been ended. If the previously-stored parameters are overwritten, the parameters can be regarded as being changed. If they are newly stored, the number of stored sets in the parameter storage section is increased accordingly.

In the above method, a plurality of sets of parameters are stored. The user can select them, thereby making it possible not only to do detailed setting unique to the bands of the multiband camera 10 but also, even when there are a plurality of parameters, to regard a group of the parameters as a set and change the parameters in sets. The user selects the stored parameter sets freely, thereby do complex setting band by band accurately in a short time.

Sixth Embodiment

Figure 11:
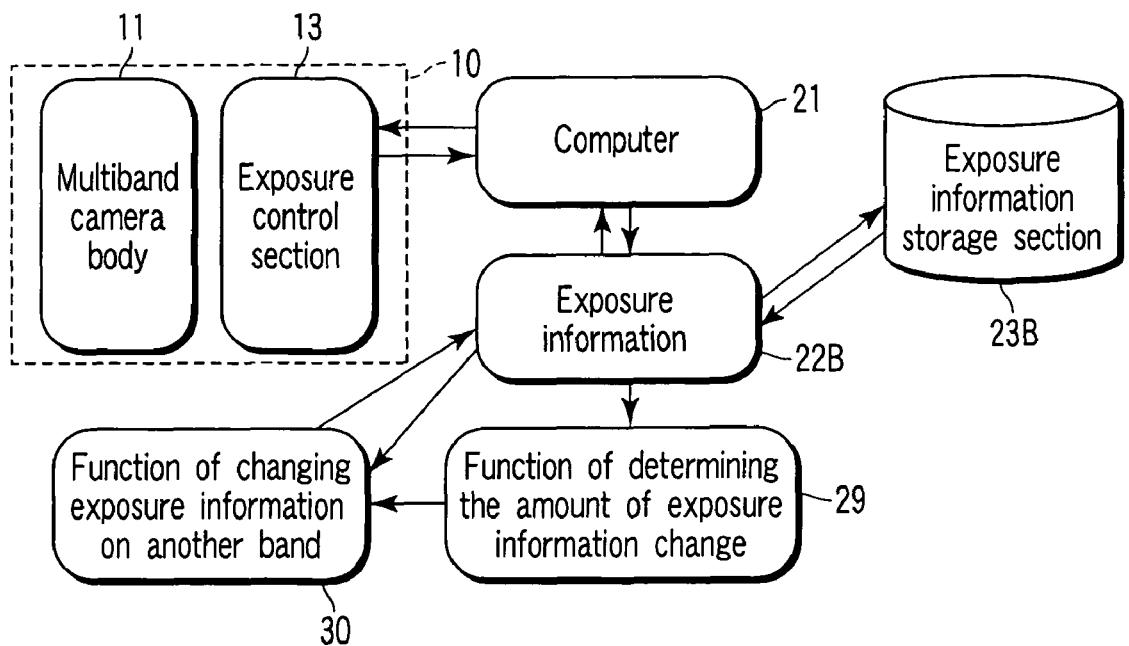
FIG. 11 shows a system configuration of a multiband camera control apparatus according to a sixth embodiment of the present invention.

As shown in FIG. 11, in a multiband camera control apparatus according to a sixth embodiment of the present invention, the multiband camera body 11 and exposure control section 13 of the multiband camera 10, the computer 21, exposure information 22B, and the exposure information storage section 23B are the same as those in FIG. 4 explained in the second embodiment. In this embodiment, a multiband camera control program caused to run on the computer 21 includes the function 29 of determining the amount of exposure information change and the function 30 of changing exposure information on another band. The function 29 of determining the amount of exposure information change is the function of calculating the amount of exposure information change by making a relative comparison between exposure information 22B in one band and that in another. The function 30 of changing exposure information on another band is to rewrite exposure information 22B by changing exposure information 22B on the remaining bands with reference to the amount of change determined by the function 29 of determining the amount of exposure information change. The rewritten exposure information 22B is transmitted by the computer 21 to the exposure control section 13 of the multiband camera 10, with the result that the value set in the multiband camera 10 can be rewritten.

Hereinafter, the way the user actually uses the present embodiment to change the exposure time will be explained. Suppose the multiband camera 10 has 4 bands.

Specifically, the user sets a suitable exposure time for each band. To do this, a reference image for determining the spectral reflectivity using a standard white board as a reference is suitable for a subject for setting an exposure time. At this time, suppose a combination of exposure times that prevents overexposure is {band 1, band 2, band 3, band 4}={1/60, 1/30, 1/120, 1/240}. Then, the function 29 of determining the amount of exposure information change holds the ratio of exposure times between bands in the form of {1/2, 1, 1/4, 1/8}.

Next, the subject is changed and a gray reflecting plate is captured. At this time, suppose band 4 is selected. In this case, suppose setting a suitable exposure time gives 1/120. Referring to the ratio of exposure times {1/2, 1, 1/4, 1/8} previously set, the function 30 of changing exposure information on another band determines new exposure times, giving {1/30, 1/15, 1/60, 1/120}.

Figure 2:
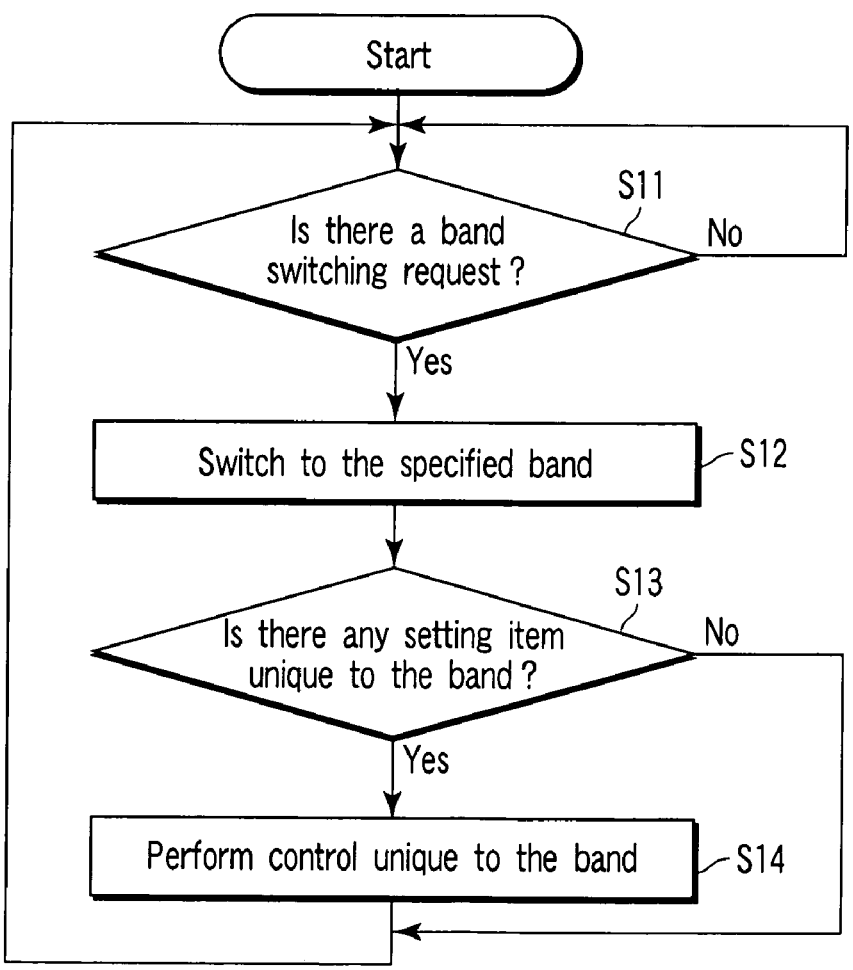
FIG. 2 is a flowchart to help explain a multiband camera control method using parameters, and more particularly a part of the band switching function which is a part of a program that is executed on a computer in using the multiband camera and comprehensively carries out processes including image acquisition, live image acknowledgement, and post-processing.

Therefore, when the flowchart of FIG. 2 is applied to an exposure time changing process, band switching in step S11 can be done from 1 to 4. When band switching is done in step S12 and the exposure time is changed band by band in step S14, the exposure time can be changed with reference to {1/30, 1/15, 1/60, 1/120} determined as described above in such a manner that 1/30 is used if the band is switched to band 1 and 1/15 is used if the band is switched to band 2.

In the above method, the ratio between bands is determined using the exposure times once set and then stored and the exposure time for a desired one band is changed in new picture taking, which makes it possible to set the exposure times for all bands correctly. The user need not recalculate the exposure times for all of the bands each time the brightness of the light source or the subject is changed, which produces the effect of setting parameters, including exposure time, exactly in a short time before picture taking.

Seventh Embodiment

Figure 12:
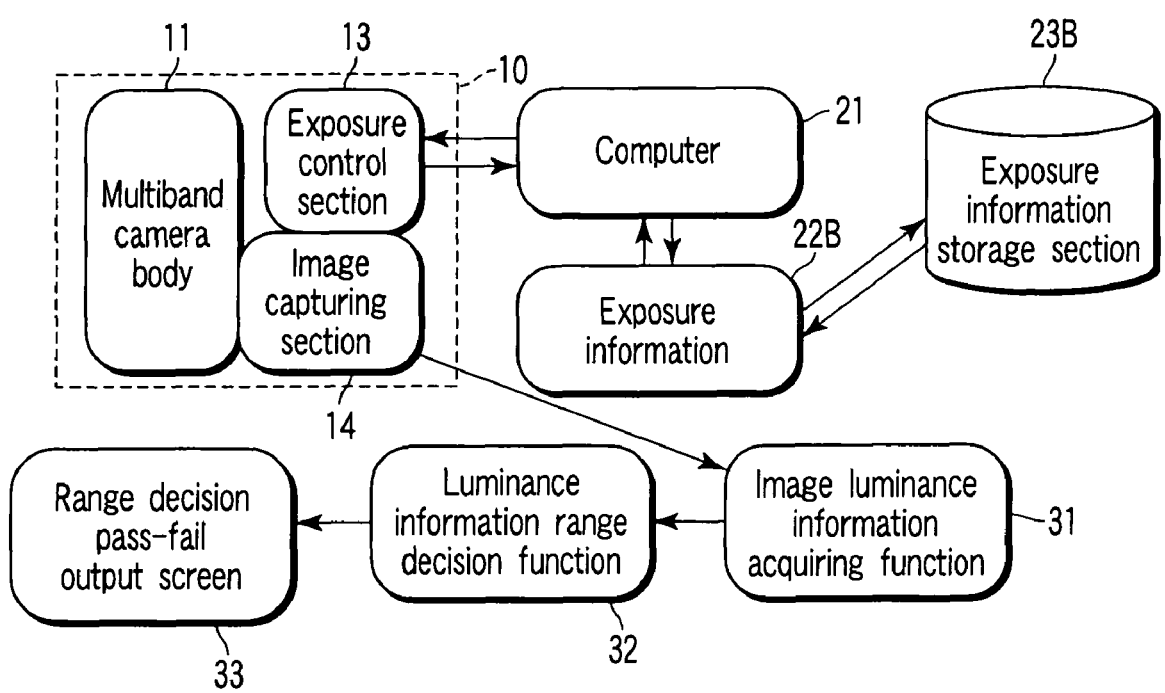
FIG. 12 shows a system configuration of a multiband camera control apparatus according to a seventh embodiment of the present invention.

As shown in FIG. 12, in a multiband camera control apparatus according to an seventh embodiment of the present invention, the multiband camera 10 can be divided into the multiband camera body 11, the exposure control section 13, and an image capturing section 14. The image capturing section 14 converts an image captured by the multiband camera body 11 into an image signal, such as an electric signal, which the computer 21 can recognize and outputs the resulting signal. A multiband camera control program run on the computer 21 has an image luminance information acquiring function 31 and can recognize the image signal digitized by the image capturing section 14 of the multiband camera 10 in the form of the luminances (or signal intensities) of individual pixels. The program further has a luminance information range decision function 32 and determines whether the luminance fits in a given range. The result of the determination is displayed on a range decision pass-fail output screen 33, informing the user of the result.

Hereinafter, the way the user actually uses this embodiment to output the result of determining whether the luminance fits in a specified range will be explained. Here, suppose the multiband camera 10 has 18 bands.

Specifically, the user sets a suitable exposure time for each band. The image is output on a display attached to the computer 21. Generally, the luminance is in the range of 0 to 255 in each of Red, Green, and Blue outputs. In this case, the intermediate color is expressed with (Red, Green, blue)=(0, 0, 0) being black and (255, 255, 255) being white. Since Red, Green, and Blue are independent of one another, (255, 0, 0) indicates red and (0, 255, 0) means that green can be displayed. Moreover, (0, 255, 255) represents yellow. In this way, display colors are reproduced using 256*256*256 combinations. In the case of 3 bands or more, it is difficult to represent colors on the normal display. Therefore, in this embodiment, suppose a representation is given using the gray scale on a band-by-band basis. Specifically, in the relationship of (Red, Green, Blue), first, display colors with Red=Green=Blue are made gray intermediate colors ranging from black at (0, 0, 0) to white at (255, 255, 255) and 256 display colors are used.

The image capturing section 14 includes an image capturing element and an A/D converter (which are not shown). In the image capturing section 14, after the image capturing element converts an image signal into an electric signal, the A/D converter converts the electric signal into digital signal values. The A/D converter is available in 8-bit, 10-bit, 12-bit, and 16-bit resolutions. In this embodiment, suppose the A/D converter has a 16-bit resolution. In that case, one pixel is converted into 16-bit data, which is recognized by the image luminance information acquiring function 31. In displaying an image, the data is caused to fit in the range of 0 to 255 so that the image can be displayed in 256 display colors. The simplest way of causing 16-bit data to fit in 256 tones or 8-bit tones is to regard only the high 8 bits of data out of 16 bits of data as 8-bit tones. That is, the high 8 bits out of 16 bits are used as 8-bit data in displaying and the low 8 bits out of 16 bits of data are discarded.

Figure 13:
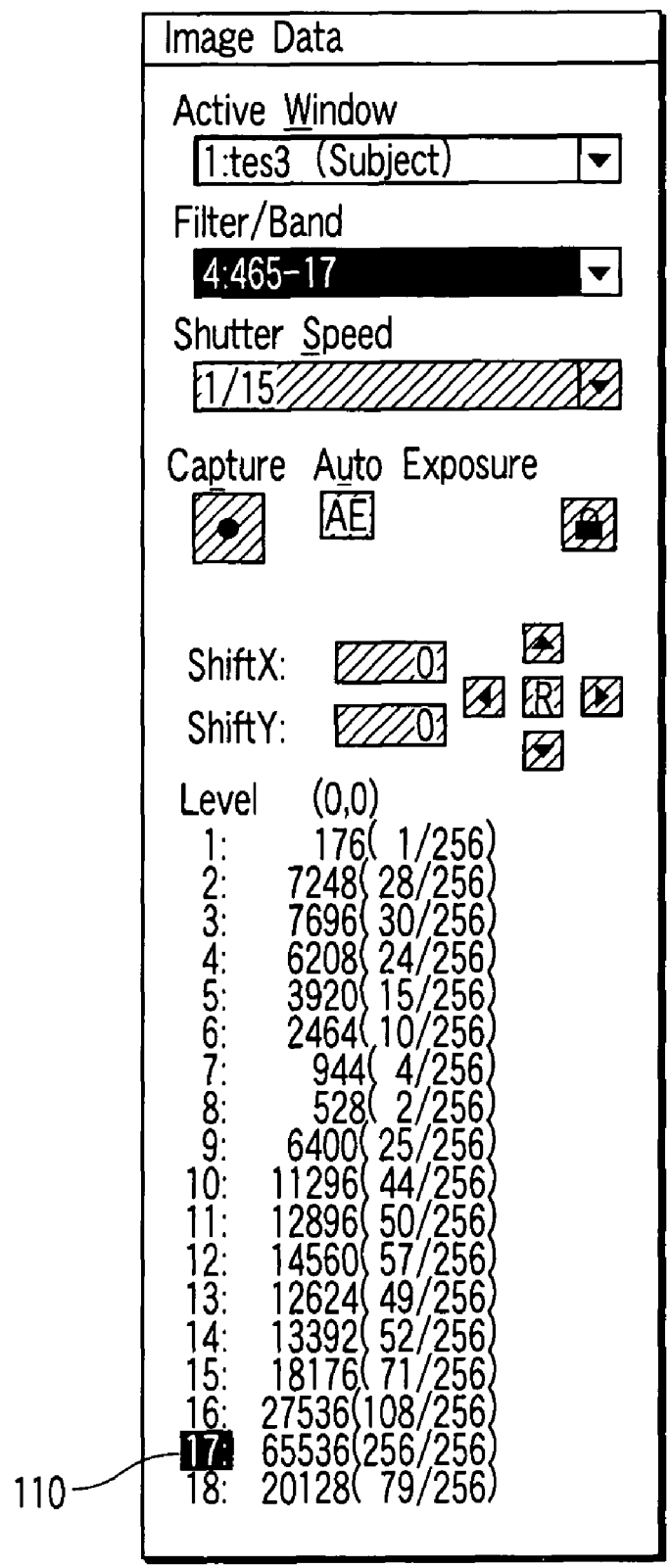
FIG. 13 shows an example of a GUI for controlling the multiband camera as an example of a range pass-fail decision output screen.

Therefore, a value exceeding 65280 (FF00 in hexadecimal), that is, a value in the range from 65281 (FF01 in hexadecimal) to 65535 (FFFF in hexadecimal), is rounded to 255 (FF in hexadecimal). This information may be ignored. Alternatively, depending on the nature of the A/D converter or the user's intention, it may be determined that overexposure has occurred. In this example, the image luminance information acquiring function 31 converts the data into 16-bit data and sends it to the luminance information range decision function 32, which determines whether the data has exceeded 65280. If the data has exceeded 65280, the luminance information range decision function 32 outputs the result to the range decision pass-fail output screen 33. FIG. 13 shows an example of the range decision pass-fail output screen 33. In FIG. 13, for example, when band 17 among 1 to 18 band images is overexposed, numeral 17 indicating the band is displayed in a highlighting manner 110, such as in an outline number on a red background, thereby representing the overexposed band.

Furthermore, similarly, the luminance information range decision function 32 can display underexposure as data equal to 1000 or less obtained at the image luminance information acquiring function 31, or display the underexposed state on the screen of FIG. 13 in another representation. Moreover, depending on the maker providing the multiband camera 10 and the intention of the user using the camera, the overexposure threshold value and underexposure threshold value can be set in the luminance information range decision function 32. For example, 60000 or more is set to overexposure without being tied to the A/D converter bit representation.

In the above method, the threshold values are set, whether the exposure time has been exceeded or insufficient is found by making a determination on the basis of the threshold values, and the results are displayed on the screen, which enables the user to check at a glance whether the exposure times for all of the bands have been set correctly. Since the user need not check band by band whether the exposure time has been exceeded or insufficient, this produces the effect of setting parameters for exposure time exactly in a short time before picture capturing.

Eighth Embodiment

As shown in FIG. 14, in a multiband camera control apparatus according to an eighth embodiment of the present invention, the multiband camera 10, computer 21, parameters 22, and parameter storage section 23 are the same as those in FIG. 10 explained in the fifth embodiment. The multiband camera control apparatus of this embodiment further includes an ID input/output management section 34. The ID input/output management section 34 relates user-input IDs to a plurality of parameter sets stored in the parameter storage section 23.

Hereinafter, the way the user actually selects the parameters will be explained. The user who uses software that controls the multiband camera 10 inputs at least once an ID (Identification) for identifying parameters uniquely, when the software starts up or before or after the parameters 22 are stored. An input screen as shown in FIG. 15 is used. On the input screen, an identification number, such as the name of the user, is input as user ID. When a parameter is related to the user's confidential information, "password" can be input to protect the information. Of course, the "password" may not be used, depending on the purpose.

When this operation is carried out, the parameter select section 28 searches the parameter storage section 23 for the user ID and, if there is a stored one, updates the parameter, and if not, creates a new set of parameters. If the user wants to set another parameter set, the user can switch by inputting the user ID again in FIG. 15.

As described above, the user ID has to be input twice, that is, when existing parameters are read and when the parameters are stored in case of newly set or change. When the user starts up software that controls the multiband camera 10 and does not change the parameter set until the software has ended, the two work operations may be reduced to one by inputting the user ID on the screen of FIG. 15 only at the start-up of the software.

In the above explanation, the way of switching between parameter sets by setting the parameter storage section 23 for individual users using user IDs has been described. The parameter sets may not be created on a user-by-user basis. For example, the user can set arbitrarily a subject to be captured, an experimental project, a laboratory, the date of an experiment, or the like as a coherent unit.

In the above method, a plurality of sets of parameters are stored. The user can select the parameter sets, which makes it possible to make a detailed setting unique to the bands of the multiband camera 10 in each band. Moreover, even when there are a plurality of parameters, one group of the parameters can be regarded as one set and the parameters can be changed in sets. The user gives the ID an arbitrary meaning, such as an individual name, the subject of an experiment, or the date of an experiment, which makes it possible to distinguish the parameter sets in a one-to-one or one-to-many correspondence. The user selects the uniquely determined parameter sets freely, which produces the effect of doing a complex setting of each band exactly in a short time.

Ninth Embodiment

As shown in FIG. 16, in a multiband camera control apparatus according to a ninth embodiment of the present invention, the multiband camera 10, computer 21, parameters 22, parameter storage section 23, parameter select section 28, and ID input/output management section 34 are the same as those in FIG. 14 explained in the eighth embodiment. The multiband camera control apparatus of this embodiment further includes an OS login function 35. Instead of the user inputting the ID on the ID input screen or the like, the ID input/output management section 34 gets login information on the OS (operating system), regards the ID of the login as the ID of the program for controlling the multiband camera 10, and relates a plurality of parameter sets stored in the parameter storage section 23 to the ID.

Hereinafter, the way the user actually selects the parameters will be explained. Suppose the computer 21 is a personal computer that meets the requirement for Windows® 2000 OS (operating system) to operate. The power supply of the personal computer is turned on. After a short time, the OS starts up and asks the user to log on. Without the login here, the user cannot use the personal computer through OS. After the login, the user starts up software that controls the multiband camera 10. Although ID is needed when the user accesses the parameters 22, the ID input/output management section 34 inquires of an OS login function 35 for the ID and regards the ID as the input of the ID by the user as explained in the eighth embodiment.

After this process is completed, the parameter select section 28 searches the parameter storage section 23 for the user ID and, if there is a stored one, updates the parameter, and if not, creates a new set of parameters.

Although the ID in logging on the OS explained in the above sequence means the user's individual ID and corresponds to the method of switching parameter sets by setting the parameter storage section 23 for the individual user, parameter sets may not be created on a user-by-user basis. For instance, the user can set arbitrarily a subject to be captured, an experimental project, a laboratory, the date of an experiment, or the like as a coherent unit. Therefore, not only does the user log on to the OS using the user's individual ID, but the user also may register in the OS the IDs for the units including a subject to be captured, an experimental project, a laboratory, and the date of an experiment and carry out a login operation using the unit to access the necessary parameter.

In the above method, a plurality of sets of parameters are stored. The user can select the parameter sets, which makes it possible to do detailed setting unique to the bands of the multiband camera in each band. Moreover, even when there are a plurality of parameters, one group of the parameters can be regarded as one set and the parameters can be changed in sets. The user gives the ID an arbitrary meaning, such as an individual name, the subject of an experiment, or the date of an experiment, which makes it possible to distinguish the parameter sets in a one-to-one or one-to-many correspondence. Moreover, since the ID is related equally to the ID in logging on to the OS, not only can the software that controls the multiband camera 10 be used each time the OS is logged on to, but the desktop environment, mail, and Internet browser environment prepared for the ID in logging on to the OS can also be related to the software that controls the multiband camera 10. Therefore, the user selects the uniquely determined parameter sets freely, which produces the effect of doing complex setting of each band exactly in a short time.

The present invention has been explained using the embodiments. However, the invention is not limited to the above embodiments and, of course, may be practiced or embodied in still other ways without departing from the spirit or essential character thereof.

What is claimed is:

1. A multiband camera control apparatus comprising:
a multiband camera configured to capture a plurality of color bands;
a computer configured to control the multiband camera;
a user interface configured to transmit instruction information for the control from a user to the computer; and
a parameter storage section configured to store parameters configured to control a corresponding band, respective parameters being provided for each of the plurality of bands, wherein the parameters include a plurality of parameter values necessary to set the multiband camera, for each of the plurality of bands;
wherein the user interface includes a switching instruction section configured to input an instruction to switch between the plurality of bands;
wherein the computer is configured to control the multiband camera by using the parameters corresponding to the band selected according to the instruction to switch between the plurality of bands from the switching instruction section;
wherein when a setting of any band of the multiband camera has been changed, a parameter value of the band is changed to correspond to the changed setting, and the changed parameter value is stored in the parameter storage section;
wherein the multiband camera includes an exposure control section configured to change exposure information, the exposure control section being configured to be controlled by the computer;
wherein one of the parameter values for each band is exposure information; and
wherein when a setting of exposure information has been changed in capturing, the exposure information parameter value is changed to correspond to the changed exposure information, and the changed exposure information parameter value is stored in the parameter storage section.

2. The multiband camera control apparatus according to claim 1, wherein the computer is configured to, when newly starting up a program after the changed exposure information parameter value is stored, read the last stored exposure information from the parameter storage section automatically and control the exposure control section of the multiband camera automatically.

3. The multiband camera control apparatus according to claim 1, further comprising:
a section configured to, when exposure information for one of the plurality of bands has been changed with respect to the stored exposure information parameter value for the band, determine a relative amount of change before and after the change; and
a section configured to reflect the determined amount of change to the others of the plurality of bands and change the exposure information parameter value for the others of the plurality of bands.

4. The multiband camera control apparatus according to claim 1, further comprising:
a section configured to acquire luminance information on one of all of and a part of images captured by the multiband camera; and
a section configured to determine whether the acquired luminance is inside or outside of a range between an estimated minimum value and maximum value, and wherein the user interface has a function of causing the user to check simultaneously the results determined in at least two bands.

5. The multiband camera control apparatus according to claim 1, wherein the multiband camera includes a focus control section configured to change a focus position, the focus control section being configured to be controlled by the computer;
wherein one of the parameter values for each band is focus position information; and
wherein when a setting of an in-focus position has been changed in capturing, the focus position parameter value is changed to correspond to the changed focus position, and the changed focus position parameter value is stored in the parameter storage section.

6. The multiband camera control apparatus according to claim 5, wherein the computer is configured to, when newly starting up a program after the changed focus position parameter value is stored, read the last stored focus position information from the parameter storage section automatically and control the focus control section of the multiband camera automatically.

7. The multiband camera control apparatus according to claim 1, wherein the user interface includes a plurality of menus, buttons, and icons to control a plurality of parameters; and
wherein the computer is configured to count a number of times each of the plurality of menus, buttons, and icons has been used, and to relatively compare the number of times each of the plurality of menus, buttons, and icons has been used and change sizes of the menus, buttons, and icons on the user interface based on the number of times each of the plurality of menus, buttons, and icons has been used.

8. The multiband camera control apparatus according to claim 1, wherein the user interface includes a plurality of menus, buttons, and icons to control a plurality of parameters; and
the computer is configured to (i) count a number of times each of the plurality of menus, buttons, and icons has been used, (ii) store the number of times each of the plurality of menus, buttons, and icons has been used, and (iii) temporarily disable the function of one of the menus, buttons, and icons on the user interface whose frequency of use is determined by the user to be low among the plurality of menus, buttons, and icons, based on the stored number of times each of the plurality of menus, buttons, and icons has been used.

9. The multiband camera control apparatus according to claim 1, wherein the parameter storage section is configured to store at least two sets of parameters, each set including one of all of and a part of the parameters, and
wherein the multiband camera control apparatus further comprises a set specify section configured to enable the user to specify a desired one set from the plurality of sets uniquely.

10. The multiband camera control apparatus according to claim 9, further comprising an ID management section configured to enable the user to input an ID to specify the set uniquely.

11. The multiband camera control apparatus according to claim 10, wherein the ID management section obtains an ID used to login to an operating system of the computer as the ID to specify the set uniquely.

* * * * *